US008943993B2

(12) United States Patent
Mueller

(10) Patent No.: US 8,943,993 B2
(45) Date of Patent: Feb. 3, 2015

(54) VARIABLE HULL LENGTHS FOR WATERCRAFT

(71) Applicant: Peter A. Mueller, Gattikon (CH)

(72) Inventor: Peter A. Mueller, Gattikon (CH)

( * ) Notice: Subject to any disclaimer, the term of this patent is extended or adjusted under 35 U.S.C. 154(b) by 0 days.

(21) Appl. No.: 14/016,640

(22) Filed: Sep. 3, 2013

(65) Prior Publication Data

US 2014/0000504 A1    Jan. 2, 2014

Related U.S. Application Data

(63) Continuation of application No. 12/735,272, filed as application No. PCT/CH2008/000551 on Dec. 30, 2008, now abandoned.

(30) Foreign Application Priority Data

Dec. 31, 2007   (CH) ........................................ 2029/07

(51) Int. Cl.
| B63B 1/08 | (2006.01) |
| B63B 1/20 | (2006.01) |
| B63B 1/22 | (2006.01) |
| B63B 1/28 | (2006.01) |
| B63B 39/06 | (2006.01) |
| B63B 1/16 | (2006.01) |
| B63B 1/32 | (2006.01) |

(52) U.S. Cl.
CPC ... *B63B 1/20* (2013.01); *B63B 1/08* (2013.01); *B63B 1/16* (2013.01); *B63B 1/32* (2013.01); *B63B 39/061* (2013.01); *B63B 2039/065* (2013.01); *Y02T 70/12* (2013.01)

USPC ............ 114/271; 114/284; 114/285; 114/291

(58) Field of Classification Search
CPC ............ B63B 1/04; B63B 1/042; B63B 1/08; B63B 1/20; B63B 1/22; B63B 2001/20; B63B 2001/201; B63B 2001/202; B63B 1/30; B63B 39/06; B63B 39/061; B63B 2001/281; B63B 2001/285; B63B 2001/286
USPC .............. 114/61.29, 271, 288–291, 285, 286; D12/300, 307, 310–314
See application file for complete search history.

(56) References Cited

U.S. PATENT DOCUMENTS

| 1,760,696 | A | * | 5/1930 | Herrmann ...................... 114/291 |
| 1,784,071 | A | * | 12/1930 | Norman ......................... 114/289 |
| 2,985,130 | A | * | 5/1961 | Jacobs et al. .................. 114/285 |
| 3,001,499 | A | * | 9/1961 | Jacobs et al. .................. 114/285 |
| D286,038 | S | * | 10/1986 | Dopps .......................... D12/307 |
| 6,058,873 | A | * | 5/2000 | Koyanagi ...................... 114/291 |
| 6,629,507 | B2 | * | 10/2003 | Biddison ....................... 114/271 |

FOREIGN PATENT DOCUMENTS

| JP | 58152691 | A | * | 9/1983 | ............... B63B 1/08 |
| JP | 2001088778 | A | * | 4/2001 | .............. B63B 43/14 |

* cited by examiner

*Primary Examiner* — Ajay Vasudeva
(74) *Attorney, Agent, or Firm* — Oliff PLC

(57) ABSTRACT

Watercraft having a hull and a stern and including at least two additional floaters stretching out at the stern of a watercraft, wherein the additional floaters form a U at the stern of the watercraft, wherein the additional floaters and the hull each include bottoms and the bottoms of the additional floaters are positioned above the hull bottom, and wherein the bottoms of the additional floaters are stepped by one or more steps.

11 Claims, 4 Drawing Sheets

VARIABLE HULL LENGTHS FOR WATERCRAFT

This is a Continuation of Application No. 12/735,272 filed Sept. 28, 2010, which in turn is a National Phase of PCT/CH2008/000551 filed Dec. 30, 2008, which claims the benefit of Swiss Patent Application No. 2029/07 filed Dec. 31, 2007. The disclosure of the prior applications is hereby incorporated by reference herein in its entirety.

TECHNICAL FIELD

The invention is based on a variable hull length for watercraft according to the generic name of the first claim.

BACKGROUND OF THE INVENTION

Watercraft hulls should be able to go through the water with as little resistance as possible. For this reason, to reduce the harmful frictional resistance, various auxiliary means have been introduced, as for eg means which influence the laminar flow, as described in U.S. Pat. No. 5,819,677 or by reducing the partial wetted lifting areas on the hull or and by introducing air by having special air ducts as described in U.S. Pat. No. 5,685,253.

The not particularly good riding performance at low speed and during acceleration of gliding hulls can be improved by additional buoyancy and stability, such as fixing or integrating extensions onto the hull rear end as described in U.S. Pat. No. 3,783,810. These aids enable the vessel to get quicker to planing and at the same time reducing trim, which improves the view over the bow. The same result can also be achieved successfully by mounting rigid trimtabs.

SUMMARY OF THE INVENTION

The invention involves that the hull performance of a watercraft, whether at slow, medium or high speed operation, can be improved by means of stepped and separated added floaters, which are fixed at the stern and make specific use of static as well as of dynamic lifting mean, as well as of the omission of additional lift, according to the planing conditions.

The improvement of the hull performance at slow and medium speed is attributed to comfort, which means to generate best possible lifting in the stern area, in order to ensure a fuel saving trim position of the watercraft, as well as a good forward view especially when changing from displacement to planing speed and in addition to let the craft softly through the waves. The improvement of the hull performance at high speeds means that, when driving at a higher speed, and to achieve fuel saving in comparison to the total watercraft length this can be achieved by reducing or by the full loss of contact of the wetted surface at the stern.

The saying <the longer the better> is correct to a certain planing speed—called herein riding speed—but afterwards, friction, which means hull resistance, is hindering more than the better trim position or the reduced surface pressure of a maximised surface which means a longer hull. From this point, a smaller hull surface, which means a shorter hull is advantageous because the smaller wetted surface of a smaller, respectively shorter hull generates, due to the increased flow, nevertheless an excellent buoyancy and lets the watercraft plan more efficiently.

To enable an improvement of the hull performance for both of the different driving conditions, as well as for medium mixed driving conditions, added floaters are fixed or integrated behind the main engine, respectively at the stern of the watercraft hull with the bottom surface of the added floaters mounted higher than the watercraft's bottom so that a step is created. Unlike a conventional stepped hull which discontinues laminar flow and forces air under the hull, the additional added floaters have the primary function to reduce the surface pressure on the hull per $mm^2$, as well as due to the improved three dimensional flow, to influence positively the waves behind the watercraft (fewer waves equals more efficient drive). Furthermore, with the length of added floaters a better trimming of the craft can be generated, and at higher speed from the point on which the additional wetted hull surface of the added floaters may have a negative effect, by means of steps which allow the contact to the water flow to be cut off, therefore the watercraft becomes shorter at the waterline.

The added floaters are divided, not only to make space for the stern drives, surface piercing drives, jets or outboards, but to allow the additional, deliberately limited, bottom surface to have the best possible effect in the longitudinal direction of the watercraft so that a best possible trim effect is generated and also to minimize the purpoising on the lateral axis of the watercraft when planing, as well as to achieve a better track keeping and to create an additional lift on the inner far rear surface of the craft in sharp turns, in order to prevent the watercraft hull from ditching in this running position.

As the point on which the additional bottom surface of the added floater may cause a negative effect (on the grounds of for eg the load weight and load position within the craft) may vary, an adjustable stepping of the added floater is of advantage on the craft hull. This can be controlled by the driver or automatically by an algorithm.

In addition the deadrise angle of a V hull has a large influence on the driving comfort, fuel consumption and the top speed of a watercraft. Therefore provision has been made for a variable angle adjustment on the bottom of the additional floater so that the deadrise of the craft can be adjusted to the driving condition. The installation of such an adjustable bottom into an additional fixed or integrated added floater is simpler, compared to the installation directly into the watercraft hull, as the unused part of the additional floater can be watertight and hollow or foamed and is a safe static lifting mean. In addition trim tabs can be inserted too, further improving trimming as well as the rolling of the watercraft, whereby this can also be achieved by adjusting the entire bottom plate.

The faster a planing craft runs, the more the hydrodynamic pressure point moves to the rear. A very fast planing craft would only lie on the lifting bodies and be a very high structural load for the components. The correspondingly formed or and controlled lifting bodies prevent the hydrodynamic pressure point from moving further back but stays constant on one point because of the intentionally reduced lifting effect of the lifting bodies at higher speed. All driving conditions refer to measurable and described conditions like lying at anchor or luring or planing speed or doing turns. The erratic conditions in heavy seas are not considered.

Furthermore the added floaters can be connected to each other above the waterline and may form a reasonably priced swim plate or be used as an enlargement of the watercraft's deck.

As far as the invention is concerned this is dealt with by the features of the first claim.

Core of the invention is that by means of additional floaters, which are placed aft of a watercraft stem and have a step next to the watercraft hull and can be used as buoyancy elements to the point as long as the friction of such additional bottom surface becomes negative.

When the craft is travelling at increasing speed then the added floaters lose on purpose the active contact to the damaging resistance flow, by lifting the hull further out of the water, then the step generates a clear distance from the water's surface. Preventing the added floaters from getting into contact with damaging resistance flow while running at high speed can also be achieved by a mechanical lifting mean activated manually or by a control mean. At anchor or at low speed the added floaters generate static buoyancy.

Further advantageous advantages of the invention are listed in the subclaims

BRIEF DESCRIPTION OF THE DRAWINGS

Various exemplary aspects of the invention will be described with reference to the drawings, wherein It shows FIG. 1 A three dimensional stem view of a watercraft with two added floaters placed laterally at the stern FIG. 2 A schematic sideview of a watercraft hull in three different driving conditions, a) in displacement- or semi-displacement mode b) in planing mode c) in speed mode FIG. 3 A schematic stern view of a watercraft hull with two lateral placed added floaters which compared to the stern contour are placed somewhat elevated and slightly inwards to the stern and have auxiliary lifting mean FIG. 4 A schematic sideview of a watercraft hull with a slightly elevated rear added floater with added step with an angled upward edge FIG. 5 A schematic sideview of a watercraft hull with a rear added floater liftable lengthwise to the vessel and has mean for pitch control FIG. 6 A schematic sideview of a watercraft hull with a rear added floater which is height variable and has mean for stroke control FIG. 7 A schematic sideview of a watercraft hull with a rear added floater and therein has an integrated connecting element to the watercraft stern FIG. 8 A schematic stern view of a watercraft hull with two laterally placed added floaters on which the deadrise can be varied FIG. 9 A schematic stern view of a watercraft hull with two laterally placed added floaters on which the deadrise can be altered and has an extendable flow mean attached onto it FIG. 10 A three dimensional stern view of a watercraft hull with two laterally placed added floaters placed on the stern and attached therein accessories, whereas the added floaters are connected to each other by means of a plate and in between an inner floating device with propulsion drives is located FIG. 11a,b A schematic floor view of a watercraft hull with lateral added floaters shown here one-sided which have their mounting origin in front of or behind the stern FIG. 12 A schematic sideview of a watercraft hull with a rear added floater which is fixed to an overhead platform element.

Only essential elements of the invention are schematically shown to facilitate immediate understanding.

DETAILED DESCRIPTION OF THE EMBODIMENTS

Figure 1:
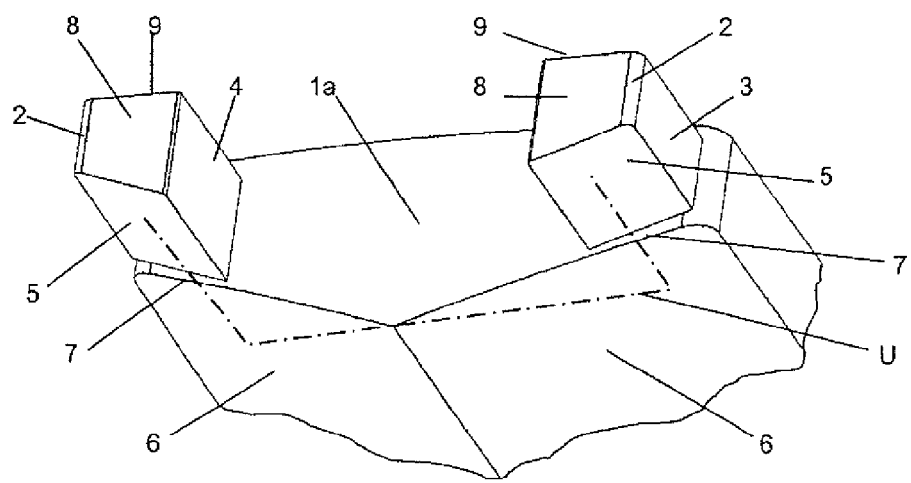

FIG. 1 Shows a three dimensional stern view of a watercraft hull 1 with two lateral added floaters 2 on the stern 1a, which on the stern 1a, according to the chain dotted line U, form a U and having outer side means 3 which run lengthwise or tapered to the watercraft longitudinal axis, as well as the inner side means 4 which are vertical or have an angle. The auxiliary bottom 5 is placed higher than the hull bottom 6 whereas the watercraft hull 1 at the stern end has a deflector 7. Finally the added floaters 2 have a transom cover 8 and a cover 9. A closed box form is advantageous, should the added floaters 2 be foamed, thereby creating a static lift. Instead of integrating a hull elongation with a step in the hull 1 thereby generating an additional lift in the region of the watercraft stern, the required additional space is divided into two auxiliary bottoms 5, which are in the added floaters 2 whereby the additional surface has an effect on a longer longitudinally length measuring unit, should both of the added floaters 2 have a distance from each other. The larger the distance of both of the added floaters 2 from each other, the longer is the auxiliary bottom 5 based on the same surface. Empirical tests have shown that a length of the auxiliary bottoms 5 in general with approximately 10% of the hull 1 and a width of 2 times 20% of the width of the hull 1 have a good value, whereby the explicit goal for riding in comfort, agility etc. has an influence on the proportion size.

The more powerful the engines are and the more they are fixed in the stern region, the greater is the wish for more dynamic lifting surface and static lifting volume in the stern region so as to avoid the hull 1 from submerging and the shorter the watercraft the more it makes sense to have the added floater 2 as long as possible so that the watercraft can do it with the least necessary trim. The additional surfaces 5 offer more buoyancy but the additional wetted area means more friction. At a certain point the friction resistance is so important that the previously achieved better trimming and the low surface pressure per $mm^2$ is no more worthwhile, as the flow speed lets the watercraft plan in total but every additional surface does not add to any additional lift but only damaging resistance. The goal is, at this point of flow speed, that flow S on the deflector 7 stalls and the added floaters 2 are no longer active. By means of this system the hull 1, according to such riding mode, can be lengthened or shortened at the waterline and create more lift or less friction. The function of the outer side means 3 is to lead the created flow S from the hull 1 with the least possible friction to the back, and also by intense inclination of the watercraft in turns, the added floater 2 lying on the innerside in such a turn achieves buoyancy by means of its outer side mean 3. When riding straightforward, the inner side mean 4 together with the deadrise angle of auxiliary bottom 5 helps to further improve the straightforward stability.

Figure 2:
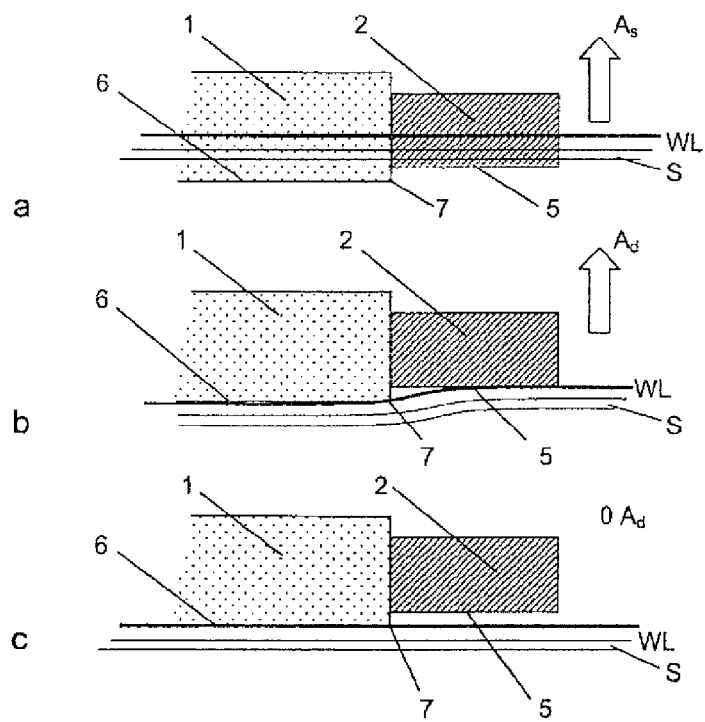

FIG. 2 Shows a schematic sideview—for better comprehension the deadrise has been omitted for technical drawing reasons—of a hull 1 in three different riding conditions, a) in the displacement or semi displacement condition the hull 1 which is designed as a gliding hull and having the added floaters 2 still completely submerged, as well as the hull bottom 6 and auxiliary bottom 5 lying under the waterline WL. The flow S is little and the added floaters 2 just give more static lift As than dynamic lift Ad. When in gliding mode b) the hull 1 rides almost on the waterline WL, the hull bottom 6, as well as the auxiliary bottom 5 lie practically on the waterline WL, the added floaters 2 only create dynamic lift Ad and in c) in the speed mode a flow stall takes place on the deflector 7 and thus the flow S flows horizontally further aft and eases behind the added floaters 2. So such added floaters 2 do not achieve additional active lift and as the auxiliary bottom 5 is no longer actively wetted, there is little or no more friction loss in that area.

In this way the hull 1 can be automatically lengthened or shortened specifically to the waterline WL and focused on the riding conditions creating more static lift As or dynamic lift Ad or no lift at all. Therewith the frictional resistance on the added floaters 2 can be influenced. Not shown, but understandable is that in heavy seas, should the bow be pointing upwards when going through a wave, by means of the added floater 2 a counter lift force can be created with the auxiliary bottom 5, thereby stabilizing the entire watercraft on the lateral axis as well as on the longitudinal axis.

Figure 3:
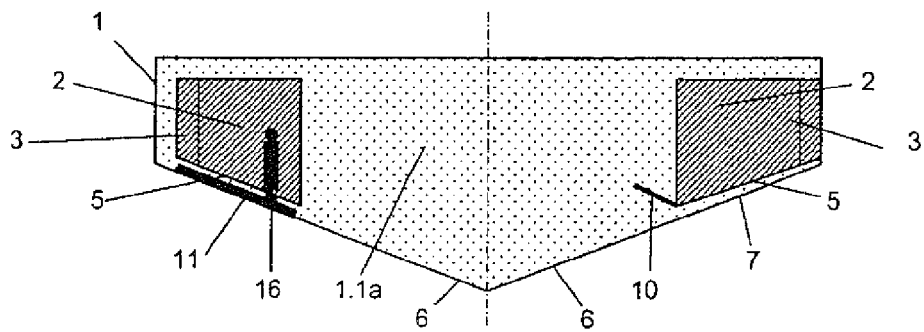

FIG. 3 Shows a schematic stern view of a hull 1 with two lateral added floaters 2 placed somewhat higher against the stern contour, which means are stepped and run aft parallel to the hull 1. The outer side parts for example are shifted slightly inwards, so that the flow 5, which originates on hull 1, can flow past to the outer side means 3 with as little resistance as possible and these can even be slightly turned up in an appropriate angle so that these can still create a positive lift even in sharp turns. The added floaters 2 are firmly fixed as modular elements on the stern 1a or directly laminated into the hull 1.

Auxiliary strakes 10 on the inner side parts, only shown in the drawing on the right side, yield added lifting and are useful in sharp turns.

In addition, the stall of flow S at the deflector 7 can be influenced by a variable trailing edge 11, only shown here on the left side. This may be varied by cylinder 16, for eg cylinders which are electrically powered or by fluids and can be operated by a computerised algorithm or manually.

From a technical design standpoint the outer side means 3 can also be flush mounted on the hull 1 which is shown in the right drawing half.

Figure 4:
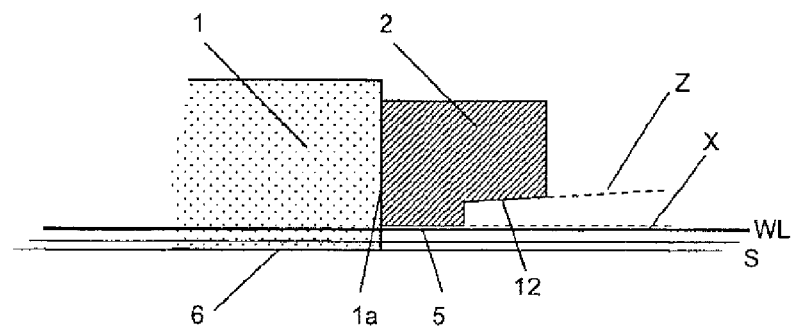

FIG. 4 Shows a schematic sideview of a hull 1 with a rear, somewhat elevated stepped added floater 2 and an integrated second additional step consisting of a secondary auxiliary bottom 12 which can show a phasing out and upward rise bevel. For better comprehension the deadrise has been omitted for technical drawing reasons. Especially in the case of leisure craft a fair valuation of the center of gravity of the craft is difficult to determine. It may be that all the passengers on board of a watercraft are at the rear of the craft and at the same time a tender is attached to the stern. Therefore it can be advantageous if the added floaters 2 are correspondingly larger dimensioned for such conditions in order to generate more static as well as dynamic lift especially when starting to plan and when in transition to the gliding phase and thus supporting the hull 1 re trimming. When riding the flow S creates enough dynamic lift Ad so that the second step with the secondary auxiliary bottom 12 does not create further active lift, therefore the friction reduction becomes of greater importance. To allow a time shifted lift effect, the auxiliary bottom 5 as well as the secondary auxiliary bottom 12, may be equipped with a phase out angle Z instead of a horizontal standard angle X. Conceivable are also multiple steps.

Figure 5:
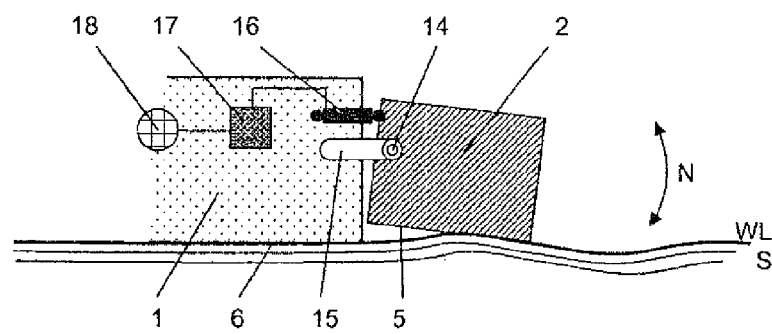

FIG. 5 Shows a schematic sideview of a hull 1 with a rear added floater 2 which is trimmable lengthwise to the craft over the trim angle N. For better comprehension and technical drawing reasons the deadrise has been omitted. This configuration is preferable to standard trim tabs 13, which also influence the flow S and also give a time limited lift. By means of auxiliary bottom 5 much better trimming may be achieved, whereby the trim angle is much smaller so that a shorter cylinder 16 can be installed in the added floater 2. The trim is achieved by pivot elements 14 which are connected to the hull 1 by a mounting bracket 15 and cylinder 16 which can be a fluid cylinder or an electric drive. The trim of the added floater 2 may be achieved manually or over an algorithm in controller 17 with corresponding trim sensors 18. Of course instead of trimming the entire added floater 2, the auxiliary bottom 5 can only be trimmed.

Figure 6:
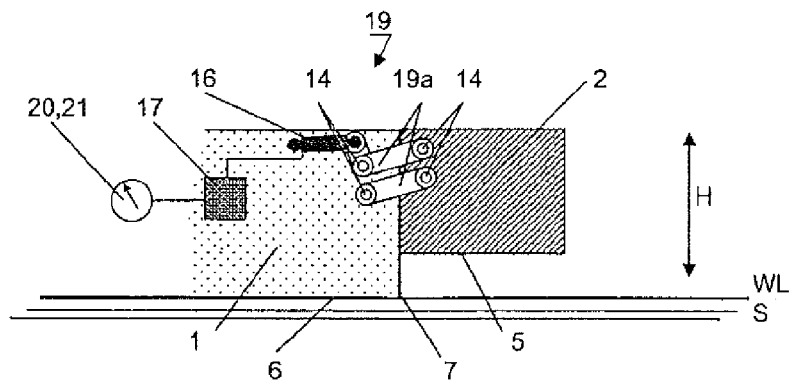

FIG. 6 Shows a schematic sideview of a hull 1 with a rear added floater 2 which is height adjustable. For better comprehension the deadrise has been omitted for technical drawing reasons. The problem to calculate the exact point at which the added floater 2 does not have any added dynamic lift Ad and where the friction causes overproportional damage, especially with craft with varying numbers of people aboard, ballast and weight distribution, the most elegant solution is to be able to vary the height of the added floater 2 independent of the hull 1 respectively to the hull bottom 6, so that the step, which means the height difference between hull bottom 6 and auxiliary bottom 5 can be controlled and corrected correspondingly. It is of advantage if the added floater 2 or the auxiliary bottom 5 is brought up as a whole, respectively the requested area is lifted up preferably parallel. Then a one-sided, which means ramp similar lifting, may lead to a "sticky" effect of the flow at the bottom of the added floater 2 or auxiliary bottom 5 and therefore does not create the requested, clear stall at the deflector 7, which shortens the wetted hull surface rather nicely and hereby reduces the friction at this point to zero. The lifting is achieved by lifting mean 19, eg by a screw driven mean or a parallelogram 19a, which is hinged on one side onto the pivot elements 14 and on the other side at the added floater 2 on hull 1. The stroke H is achieved by the cylinder 16 which is attached to the parallelogram 19 and is fixed to the hull 1. The cylinder 16 can be controlled manually or by a controller 17 which sets the stroke position on stroke H by speed gauge 20 or rpm gauge and other sensors.

Figure 7:
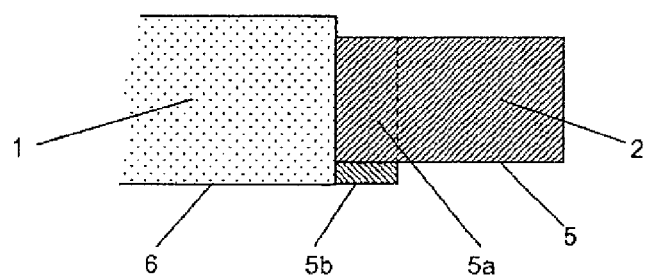

FIG. 7 Shows a schematic sideview of a hull 1 with a rear added floater 2. For better comprehension the deadrise has been omitted for technical drawing reasons. Instead of fixing the added floater 2 higher, which means stepped onto the hull 1a of the watercraft, shows first a firm link element 5a on hull 1, whereby the co-bottom 5b is put on the same level as hull bottom 6 so as to connect both parts more securely to each other, so that, as for eg by race events, these can withstand the high forces while wave jumping. But also shipyards, that modify their watercraft with regard to the installation or fixation of the added floaters 2, can also take the opportunity of extending their hull 1 so as to have an even larger model. This can be accomplished at a reasonable price by installing the added floater 2, and the link element 5a also enables a permanent connection to the other added floater 2 on the opposite side.

Figure 8:
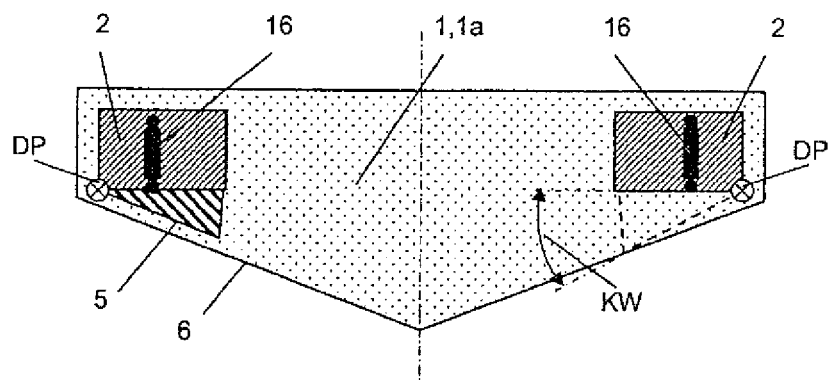

FIG. 8 Shows a schematic sideview of a hull 1 with two lateral added floaters 2, on which the deadrise can be varied by means of variable auxiliary bottom 5 which is advantageously fixed to the pivot point DP and the deadrise angle KW can be modified by cylinder 16. This function has two aims: on the one hand the degree of comfort can be set so that the watercraft moves softer through the waves thanks to a deep V of the added floaters 2, and the craft uses less fuel. On the other hand the movable auxiliary bottom 5 conveniently replaces the described target in FIG. 6 of friction reduction from a certain point by withdrawing the area of auxiliary bottom 5 from the flow S. Instead of lifting the entire added floater 2, in this technical solution only the deadrise angle KW is changed so that the flow S does not have any further active contact with the auxiliary bottom 5. The controlling of cylinder 16 is achieved exactly as in FIG. 6

Figure 9:
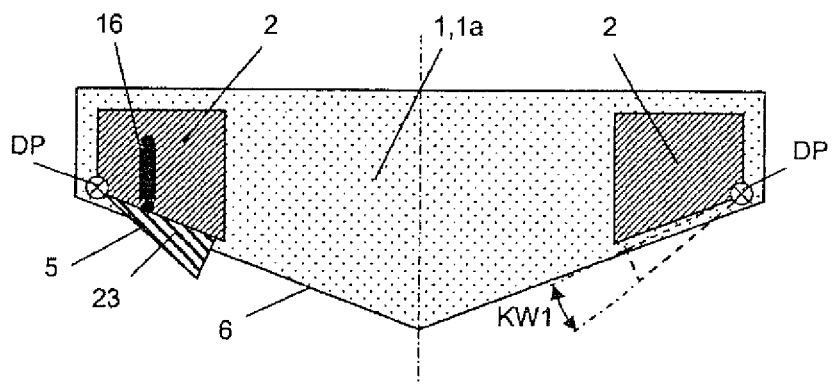

FIG. 9 Shows a schematic stern view of a hull 1 with two lateral added floaters 2 on which the deadrise can be varied over the deadrise angle KW to KW1, by means of an auxiliary bottom 5 fixed to the pivot point DP on which a flow mean 23 is attached, whereby the flow mean 23 can be led over the line of the hull bottom 6 out into the deadrise angle region KW1.

The flow mean 23 is a straight or bent plate and functions as a trim or steering mean. in front of the extended flow mean 23, in the KW1 area, a flow brake develops, therefore a lifting Ad on the hull 1 is generated, thereby changing the watercraft's trim position. Trimming means also steering, thus when lowering the flow mean 23 on one side, an additional resistance is generated which moves the watercraft in a turn around the vertical axis, thereby pushing the craft to a new course or keeping it simply but safely on track. The settings of the deadrise KW and KW1 is generated by means identical to those described in FIGS. 6 and 7. Of course, every deadrise angle adjustment KW and KW1 can also be achieved by adjusting the added floaters 2.

Figure 10:
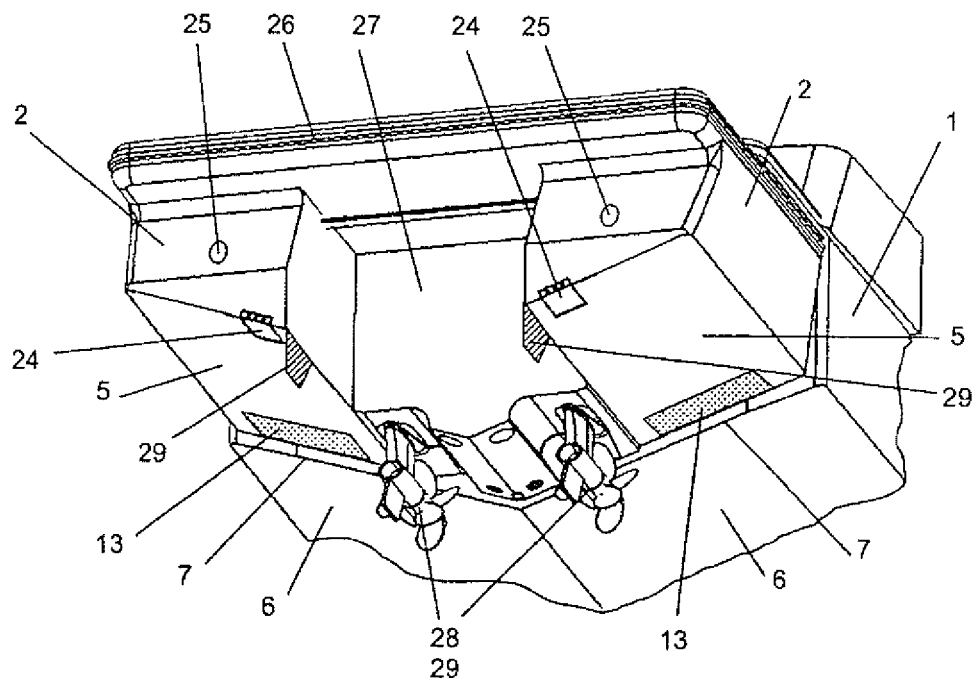

FIG. 10 Shows a three dimensional stern view of hull 1 with two lateral added floaters 2 placed parallel on the stern and the accessories 13,24,25 fitted therein, for eg. standard trim tabs 13, exhaust gas discharge 24, underwater light 25, rudder 29 and not shown here sidethrusters and or small "go home" drives and many more and are summarized as technical mean 30, whereby the added floaters 2 are connected to each other by plate 26, which may be used as a bathing platform or as part of an extended deck. Furthermore the division of the required additional lifting mean on the stern into two separate external added floaters 2 can serve so that the free space between the additional floaters 2 can be used as an inner floating device 27 which can create limited additional buoyancy and for eg can be equipped with propulsion drives 28, as for eg with propeller, jet or paddlewheel so that the engines can be pushed even further back into the stern area allowing more room for the persons on board, but at the same time allowing easy compensation regarding static lift As and dynamic lift Ad by means of added floaters 2.

Because of the attachment of the added floaters 2 to the hull 1 it is also possible to design the added floaters 2 of a material especially suitable for this stern part which can be different from the hull 1 and can locally generate more stiffness and or less weight.

Figure 11:
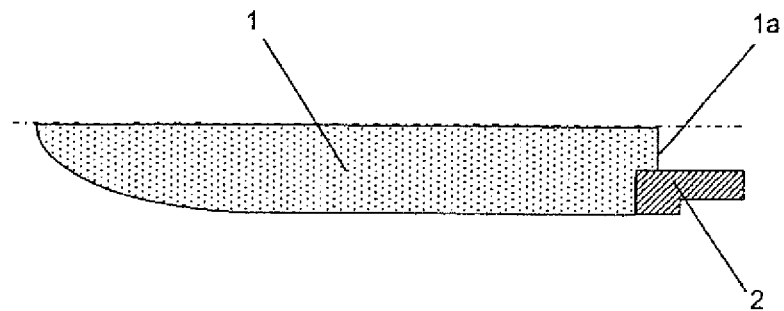
Figure 11:
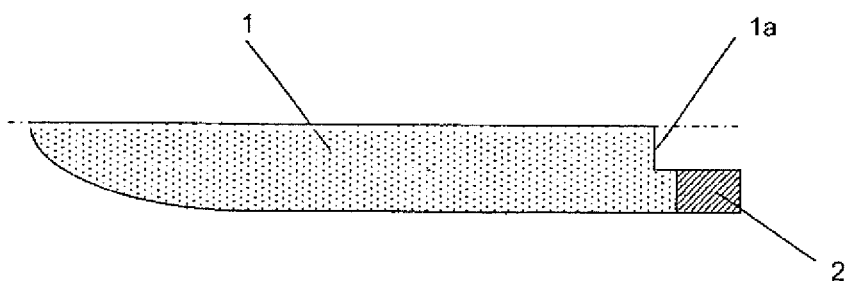

FIG. 11 a) shows a schematic bottom view of a hull 1 with a lateral added floater 2 shown from one side which is preferably fixed to the stern 1a of the hull 1 for technical production and attachment reasons and thereby has a relevantly greater percentage influence over the entire wetted area of the hull bottom 6 when varying the auxiliary bottom's 5 lifting.

b) shows a schematic bottom view of a hull 1 with a lateral added floater 2 shown from one side which for production relevant reasons, as for eg the existing molds at the shipyards, which already have lateral extensions built into their hull bottoms, onto which existing extensions the added floaters 2 can be directly attached, whereby the effect of the auxiliary bottom 5 is lower if the watercraft keeps the same in the entire length as in FIG. 11a. Both of the installations have in common that the force source whether in front of or behind the stern 1a has an influence on the wetted surface of the entire watercraft as well as on the static lift.

Figure 12:
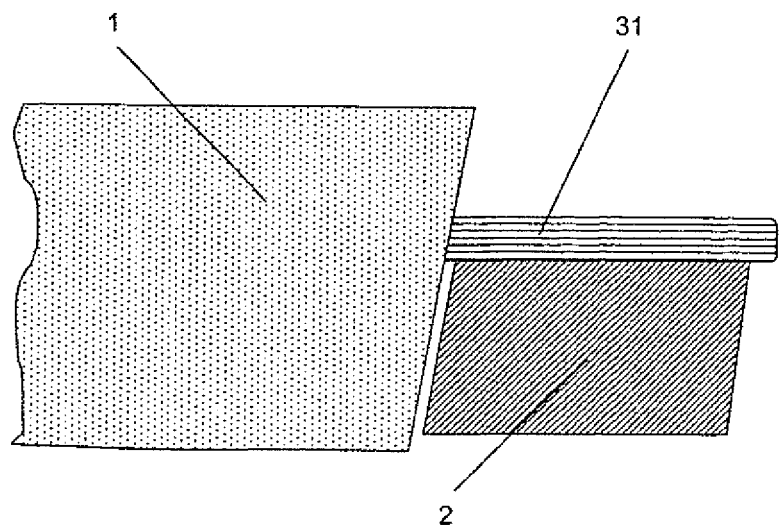

FIG. 12 Shows a schematic sideview of a hull 1 with a rear added floater 2 which is fixed onto an overhead platform element 31. Should there be an existing mold or for weight optimization reasons, it may be of advantage to leave the hull 1 as it is, and not to have any material changes but instead to install an adequate stern platform which is anyway a requested after market product, which at the same time houses the added floater 2, and so that the stern form is not affected or and to implement at the same time a light and firm material for such an additional floater 2. The gap between hull 1 and added floater 2 can be masked elegantly or shown as a design element. The platform element 31 can be fixed rigidly to the stem 1a or used as a lifting platform so that additional benefits arise from the added floaters 2.

Of course the invention is not only applicable on shown and described examples.

Drawing List 1 hull
1a stern
2 added floater
3 outer side mean
4 inner side mean
5 auxiliary bottom
5a link element
5b co-bottom
6 hull bottom
7 deflector
8 transom cover
9 cover
10 auxiliary strake
11 variable trailing edge
12 secondary auxiliary bottom
13 standard trimtabs
14 pivot element
15 mounting bracket
16 cylinder
17 controller
18 trim sensor
19 lifting mean
19a parallelogram
20 speed gauge
21 rpm gauge
23 flow mean
24 exhaust gas discharge
25 underwater light
26 plate
27 inner floating device
28 propulsion drive
29 rudder
30 technical mean 13,24,25,29
31 platform element
WL waterline
S flow
Ad dynamic lift
As static lift
H stroke
X standard angle
Z phase out angle
N trim angle
DP pivot point
KW deadrise angle

What is claimed is:
1. A watercraft comprising:
a hull having a bottom surface and a stern; and
buoyant bodies adjustably attached to a rear surface of the stern, the buoyant bodies forming a U-shape with the stern and defining a rearwardly opening space therebetween, wherein each buoyant body includes:
a bottom planing surface, substantially parallel front and rear walls, and port and starboard sides extending between the front and rear walls,
a stair step on the bottom planing surface of the buoyant body, the stair step extending laterally between the port and starboard sides and substantially parallel to the stern, the stair step dividing the bottom planing surface in a forward planing surface and a rear planing surface, the forward planing surface and the rear planing surface disposed in substantially different planes, the forward planing surface and the rear planing surface being higher than the bottom surface of the hull, the entire rear planing surface being higher than the forward planing surface, wherein the buoyant bodies are each arranged to be vertically adjusted by a lifting device to vary static lift and dynamic lift on the buoyant bodies.

2. The watercraft according to claim 1, wherein the bottom planing surfaces of the buoyant bodies have a deadrise angle similar to a deadrise angle of the hull at the stern.

3. The watercraft according to claim 1, wherein the bottom planing surfaces of the buoyant bodies are configured to be inclined in a longitudinal direction.

4. The watercraft according to claim 1, wherein a deadrise angle of the bottom planing surface of each of the buoyant bodies can be adjusted by an adjustment device.

5. The watercraft according to claim 1, further comprising: an integrated connecting piece adapted to be connected to the buoyant bodies.

6. The watercraft according to claim 1, further comprising: an inner floating device disposed between the buoyant bodies to accommodate a propulsion drive unit; and a panel that connects the buoyant bodies.

7. The watercraft according to claim 6, wherein the buoyant bodies and/or the inner floating device are attached to the stern as modules and made of different materials relative to the stern.

8. The watercraft according to claim 1, wherein one buoyant body of the buoyant bodies can be independently actuated in stroke, inclination, and deadrise adjustments relative to another buoyant body of the buoyant bodies.

9. The watercraft according to claim 1, wherein the port and starboard sides of the buoyant bodies are aligned with a longitudinal axis of the watercraft.

10. The watercraft according to claim 1, wherein the buoyant bodies have one or more of trim tabs, engine exhaust discharge, underwater lighting, and rudders.

11. The watercraft according to claim 1, further comprising: a platform attached to the stern, wherein the buoyant bodies are disposed under the platform.

* * * * *